United States Patent [19]

McAleavey

[11] Patent Number: 5,482,587
[45] Date of Patent: Jan. 9, 1996

[54] METHOD FOR FORMING A LAMINATE HAVING A SMOOTH SURFACE FOR USE IN POLYMER ELECTROLYTE BATTERIES

[75] Inventor: Michael E. McAleavey, San Jose, Calif.

[73] Assignee: Valence Technology, Inc., San Jose, Calif.

[21] Appl. No.: 78,940

[22] Filed: Jun. 16, 1993

[51] Int. Cl.$^6$ .......................... B29C 47/34; B29C 47/78
[52] U.S. Cl. .............. 156/243; 156/244.23; 156/244.24; 156/244.27; 156/247; 156/500; 264/177.12; 264/210.2; 264/211.12
[58] Field of Search .................. 156/244.24, 244.23, 156/244.27, 247, 243, 242, 500, 501, 580; 264/177.17, 210.2, 211.12

[56] References Cited

U.S. PATENT DOCUMENTS

| | | | |
|---|---|---|---|
| 3,230,126 | 1/1966 | Craver, Jr. | 156/244.27 |
| 3,540,959 | 11/1970 | Connor | 156/244.24 X |
| 4,462,852 | 7/1984 | Custor | 156/244.23 X |
| 4,830,939 | 5/1989 | Lee . | |
| 4,844,766 | 7/1989 | Held | 264/211.12 X |
| 4,859,392 | 8/1989 | Vetter | 264/210.2 X |
| 4,925,751 | 5/1990 | Shackle . | |
| 5,204,037 | 4/1993 | Fujii | 264/211.12 X |
| 5,281,290 | 1/1994 | Bosler | 156/244.24 X |

FOREIGN PATENT DOCUMENTS

| | | | |
|---|---|---|---|
| 4018530 | 12/1991 | Germany | 264/211.12 |
| 62-284719 | 12/1987 | Japan | 264/211.12 |

*Primary Examiner*—Jeff H. Aftergut
*Attorney, Agent, or Firm*—Harold R. Brown

[57] ABSTRACT

An apparatus for forming a laminate having a smooth surface includes a planar member having, on at least one side thereof, desired surface roughness characteristics, is forced against the material layer on the substrate such that the material layer attains substantially the same surface roughness characteristics as the one side of the planar member.

3 Claims, 3 Drawing Sheets

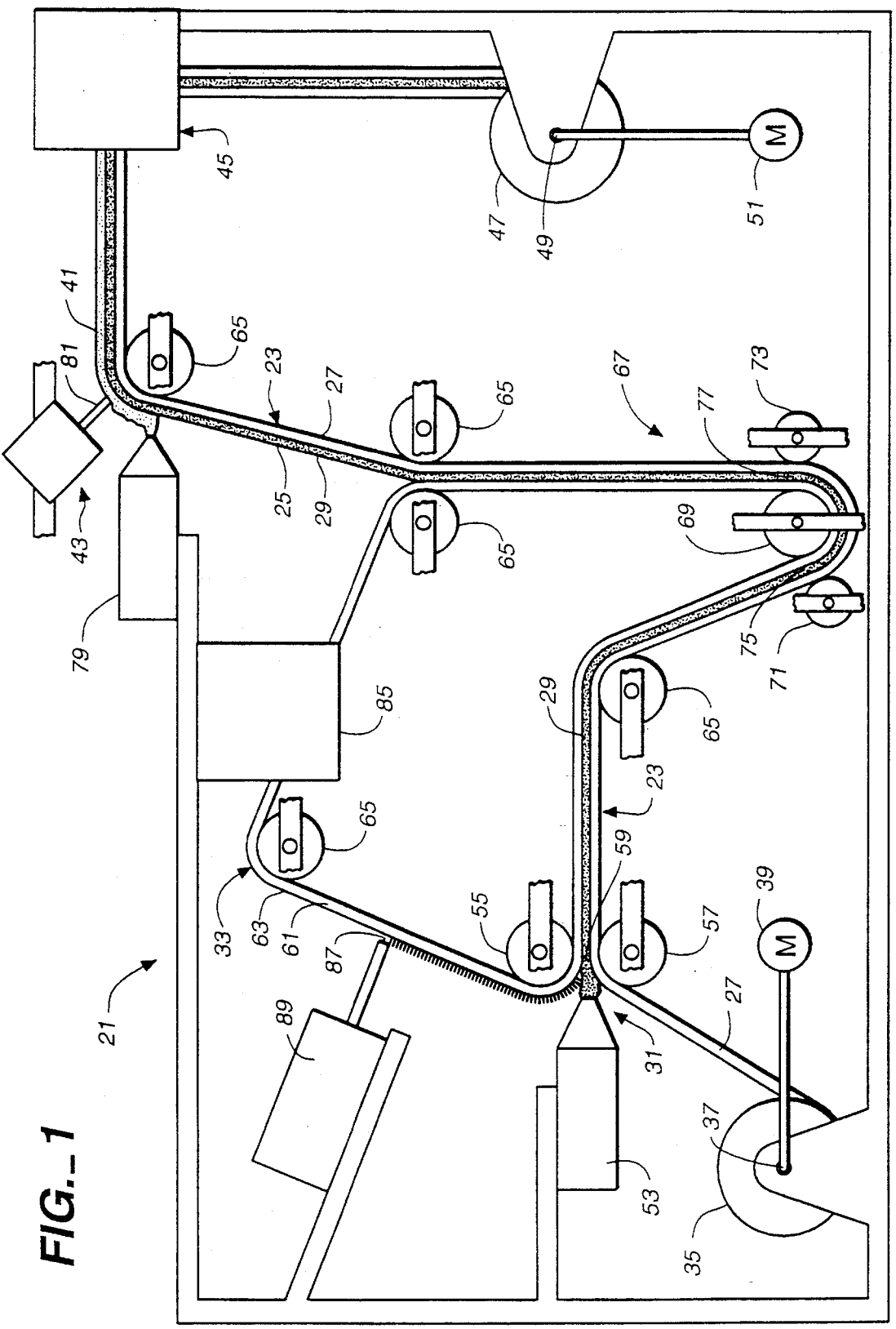
FIG._1

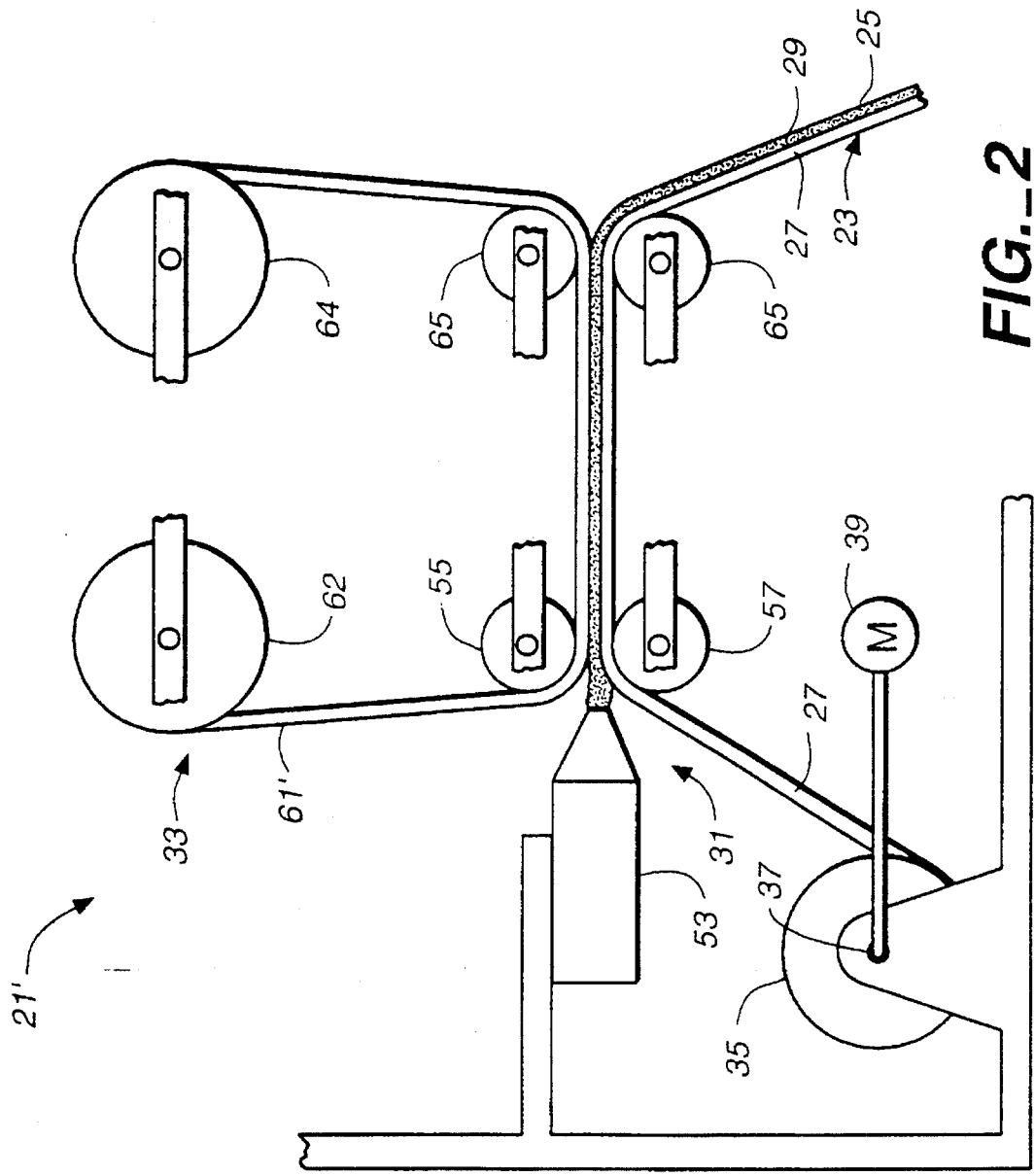
FIG._2

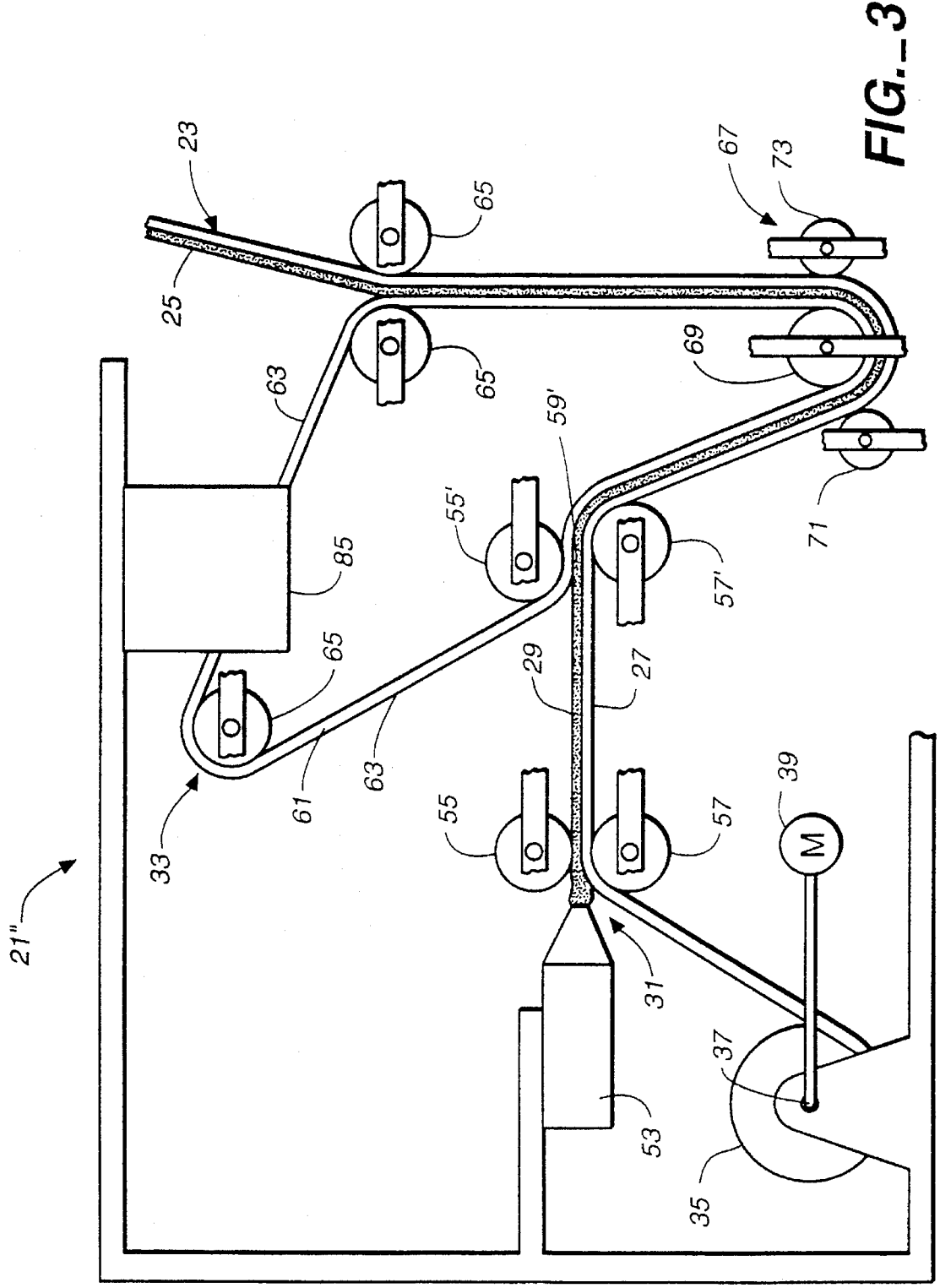
FIG._3

METHOD FOR FORMING A LAMINATE HAVING A SMOOTH SURFACE FOR USE IN POLYMER ELECTROLYTE BATTERIES

BACKGROUND OF THE INVENTION

1. Field of the Invention

The present invention relates to methods and apparatuses for forming a smooth surface and, more particularly, methods and apparatuses for forming a smooth laminate surface.

2. State of the Art

In recent years, workers in the battery art have begun to understand and recognize the advantages of so-called "laminate" batteries including solid polymer electrolytes and sheet-like anodes and cathodes. The advantages include lower battery weights than conventional batteries that employ liquid electrolytes, longer service life, relatively high power densities, relatively high specific energies, and the elimination of the danger associated with batteries containing spillable liquid electrolytes such as acids.

Laminate batteries using polymer electrolytes have been developed which possess good performance characteristics. For example, in U.S. Pat. No. 4,925,751, a laminate battery in which a cathode material formed from a mixture of an active cathodic material (preferably vanadium oxide $V_3O_8$ or $V_6O_{13}$), a conductive filler material (preferably carbon particles or filaments), and an ionically conductive polymer electrolyte material is laminated on a conductive substrate material such as a nickel or copper web or sheet. A layer of polymer electrolyte material is laminated over the laminated layer of cathode material, and an anode material is applied over the laminate layer of polymer electrolyte material. The cathode material is applied on the substrate by conventional coating techniques such as with a doctor blade method or an extrusion method.

The problems associated with production of laminate batteries include the viscosity of the cathode material, which is often as high as 1,000,000 centipoise. Because the cathode material is so viscous, it is generally necessary to form the cathode material layer by extruding the cathode material in the form of a bead or sheet onto the conductive web substrate, and then compress the cathode material between forming rollers that squeeze the cathode material to form the cathode material layer. Unfortunately, the cathode material tends to have a paste-like consistency and often sticks to the process equipment used in forming the cathode material layer, necessitating constant cleaning of the rollers and resulting in poor quality cathode material layers. Accordingly, it is desirable to provide a method and apparatus for forming a laminate having a smooth surface in which the tendency of material to adhere to process equipment used in forming the surface is minimized.

SUMMARY OF THE INVENTION

The present invention, generally speaking, provides a method and apparatus for forming a laminate having a smooth surface. In accordance with one aspect of the present invention, an apparatus for forming a laminate having a smooth surface includes means for forming a material layer on a substrate. A planar member having, on at least one side thereof, desired surface roughness characteristics is provided. Means are provided for forcing the one side of the planar member against the material layer on the substrate such that the material layer attains substantially the same surface roughness characteristics as the one side of the planar member.

In accordance with another aspect of the present invention, a method for forming a laminate having a smooth surface is described. In the method, a material layer is formed on a substrate. One side of a planar member having, on at least the one side thereof, desired surface roughness characteristics, is forced against the material layer on the substrate such that the material layer attains substantially the same surface roughness characteristics as the one side of the planar member.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a side view, largely schematic, of a system for forming a laminate having a smooth surface in accordance with one embodiment of the present invention;

FIG. 2 is a side view, largely schematic, of an apparatus for forming a laminate having a smooth surface in accordance with a second embodiment of the present invention; and FIG. 3 is a side view of yet another apparatus for forming a laminate having a smooth surface in accordance with a third embodiment of the present invention.

DETAILED DESCRIPTION OF THE PREFERRED EMBODIMENTS

In laminate batteries using polymer electrolytes, it has been found that the cathode material layer thicknesses should vary between about 25 and 250 microns. It also has ben found desirable to provide a highly smooth surface on the cathode material layer, particularly because the electrolyte material that is applied on the cathode material layer tends to flow to fill any valleys in the surface of the cathode material layer. Upon being cured, the electrolyte material forms an uneven thickness electrolyte material layer with too thick areas by valleys on the surface of the cathode material layer and too thin areas by peaks on the surface of the cathode material layer which adversely affect battery performance.

With reference to FIG. 1, an apparatus 21 for forming a laminate 23 having a smooth surface 25 is shown. The laminate 23 includes a substrate 27 and a material layer 29. The material forming the material layer 29 is preferably a material suitable for use as an electrode of a battery. The substrate 27 is preferably a conductive web, such as a continuous nickel or copper web.

The apparatus 21 includes a means 31 for forming the material layer 29 on the substrate 27 and an assembly 33 for smoothing the material layer on the substrate. In accordance with the presently preferred embodiment, the substrate 27 is fed from a roll 35 on a shaft 37. The shaft 37 is driven by a variable speed electric motor 39 such that the substrate 27 is fed at a substantially constant rate.

After the laminate 23 is formed by forming the material layer 29 on the substrate 27 by the material layer forming means 31, and the smooth surface 25 is formed by the assembly 33, the material layer 29 is coated with an electrolyte layer 41 by means 43 for applying the electrolyte layer, discussed further below. In accordance with the presently preferred embodiment, after the electrolyte layer 41 is coated on the smooth surface 25, the electrolyte layer and the material layer 29 are cured together in a single curing apparatus 45, preferably an electron beam apparatus. It is possible, however, to cure the material layer 29 in a first curing apparatus (not shown) and then apply the electrolyte layer 41 and cure it in a second curing apparatus (not shown).

The substrate 27 coated with the cured material layer 29 and the cured electrolyte layer 41 is then preferably rewound into a roll 47 on a second shaft 49. The shaft 49 is also preferably driven by a variable speed electric motor 51 so that the coated substrate 27 is rewound at a substantially constant rate. The substrate 27 is preferably maintained under sufficient tension between the rolls 35, 47 to minimize fluctuations in the substrate and to maintain tension in the substrate at approximately 1 to 5 lbs /inch width.

In accordance with the presently preferred embodiment, the material layer forming means 31 includes an extruder 53 for extruding material for forming the material layer 29 so that it is applied onto the substrate 27. The extruder 53 preferably extrudes material for forming the material layer 29 onto the substrate 27 in the form of a sheet; however, the extruder may extrude the material onto the substrate in the form of a bead. The material for forming the material layer 29 is formed into the material layer by a pair of rollers 55, 57 which define a nip 59. The substrate 27 coated with material for forming the material layer 29 is drawn through the nip 59 so that the material for forming the material layer is squeezed over the surface of the substrate into a substantially uniform thickness material layer.

At the nip 59, the surfaces of the rollers 55, 57 preferably move at the same speed as the substrate 27 coated with material for forming the first material layer 29. The rollers 55, 57 are ordinarily rotated as a result of contact between one of the rollers and one surface of the substrate 27 and the other roller and material on the other surface of the substrate, such as the material for forming the first material layer 29, however, good results have also been achieved by driving the rollers 55, 57 at a desired speed by means such as an electric motor (not shown).

The rollers 55, 57 are preferably highly polished so that imperfections in the surfaces of the rollers do not adversely affect the smoothness of the surface 25 of the laminate 23. At least one of the rollers 55, 57 is preferably movable relative to the other roller so that the pressure in the nip 59 is variable for varying the thickness of the material layer 29 and means (not shown) are preferably provided for monitoring the thickness of the laminate 23 formed from the material layer and the substrate 27 and continually adjusting the thickness of the laminate so that it is maintained at a substantially constant thickness. U.S. patent application Ser. No. 08/049,489 describes an apparatus and method for monitoring and controlling thickness of a laminate in which the thickness of a substrate and a material layer is measured and relayed to a means for moving one of a pair of rollers to adjust the size of a nip between the rollers, which is suitable for use in conjunction with the above-described system and is incorporated by reference to the extent that it describes such an apparatus and method.

In accordance with the presently preferred embodiment, the material for forming the material layer 29 is a paste-like, curable cathode material including vanadium oxide ($V_6O_{13}$, preferably, or $V_3O_8$). U.S. Pat. No. 4,925,751 describes certain materials useful in forming paste-like cathode materials, anode materials, substrate materials, and electrolyte materials and is incorporated by reference to the extent that it describes such materials.

The smooth surface 25 is formed on the laminate 23 by the assembly 33. In accordance with the presently preferred embodiment, the assembly 33 includes a planar member 61 having, on at least one side 63 thereof, desired surface roughness characteristics. In accordance with the presently preferred embodiment, the planar member 61 is formed from an endless web of substantially incompressible, longitudinally and transversely flexible material to which the material for forming the material layer 29 has a relatively low tendency to adhere. The planar member 61 is drawn through the nip 59 between the rollers 55, 57 so that the side 63 faces the material for forming the material layer 29.

The planar member 61 extends partially around the roller 55 and passes through the nip between the rollers 55, 57 which form the material for forming the material layer 29 into the material layer. In this manner, the rollers 55, 57 force the side 63 of the planar member 61 against the material for forming the material layer 29 as it is formed into the material layer, such that, as the material layer is formed, the surface roughness characteristics of the side of the planar member are imparted to the material layer. As noted above, the material for forming the material layer 29 is of a paste-like consistency. Forcing the side 63 of the planar member 61 against the material layer 29 deforms the material layer sufficiently to cause the surface 25 of the laminate 23 to assume substantially the same shape as the side of the planar member. Further, interposing the planar member 61 between the surface 25 of the laminate and the roller 55 facilitates preventing the material for forming the material layer 29 from adhering to the roller 55.

The planar member 61, beside possessing the characteristic of permitting relatively little material for forming the material layer 29 to adhere thereto, preferably possesses additional characteristics including a highly consistent thickness over its length and at least one side 63, and preferably two opposed sides, with only minimal roughness. As shown in the apparatus 21' in FIG. 2, a material layer smoothing assembly 33' can include a planar member 61' in other forms. For example, the material layer smoothing assembly 33' can include a web that is unwound from a first roll 62 into a second roll 64. One material that is suitable for use as a planar member 61, 61' is Tefzel™, manufactured by DuPont.

While the planar member 61 may be separated from the surface 25 of the laminate 23 immediately after they pass through the nip 59, further operations are preferably performed on the laminate while it is in contact with the planar member. Further, in the apparatus 21" shown in FIG. 3, the side 63 of the planar member 61 can be forced against the surface 25 of the laminate 23 after the material layer 29 has been formed in the nip 59 of the rollers 55, 57. In the embodiment shown in FIG. 3, a separate pair of rollers 55', 57' is provided downstream from the rollers 55, 57 to force the side 63 of the planar member 61 against the material layer so that the surface 25 of the laminate 23 is caused to deform to substantially the same smoothness as the side of the planar member. Like the rollers 55, 57, one or more of the rollers 55', 57' is preferably movable to adjust the size of the nip 59' formed therebetween.

With reference to FIG. 1, the apparatus 21 generally includes one or more redirecting rollers 65. As noted above, the planar member 61 is preferably flexible so that, as the laminate 23 is redirected around the redirecting rollers 65, the planar member follows the path of the laminate. Further, prior to application of the electrolyte layer 41 onto the surface 25 of the laminate 23, it is necessary to remove the planar member 61 from the surface of the laminate. Accordingly, a redirecting roller 65 is provided to redirect one or both of the laminate 23 and the planar member 61 so that the planar member is separated from the surface 25 of the laminate. Of course, if desired, the substrate 27 on which the material for forming the material layer 29 or the material layer is applied and the planar member 61 may be redirected around a number of rollers, including the rollers 55, 57, 55', and 57'.

As noted above, it is preferred to perform additional operations on the laminate 23 while it is in contact with the planar member 61 so that formation of a smooth surface 25 is enhanced. A chilled roller apparatus 67 is preferably provided for chilling the material layer 29 as the side 63 of the planar member 61 is in contact with the material layer. The material layer 29 is chilled to a temperature such that it becomes substantially solid and has a reduced tendency to adhere to the planar member 61.

The chilled roller apparatus 67 includes a chilled roller 69, which is generally a hollow roller through which chilled liquid is circulated, and one or more rollers 71, 73 defining nips 75, 77 between which the laminate 23 and the planar member 61 are passed. The planar member 61 is positioned between the highly polished surface of the chilled roller 69 and the material layer 29 so that the material layer 29 does not adhere to the chilled roller. As noted above, the substrate 27 is maintained in tension, which facilitates maintaining good heat transfer between the material layer 29 and the surface of the chilled roller 69 by holding the laminate 23 tightly against the planar member 61 as they pass around the chilled roller so that there is substantially no potentially insulating space between the chilled roller, the planar member, and the material layer. Preferably, at least the upstream roller 71 further presses the planar member 61 against the material layer 29 so that the surface 25 of the laminate 23 is further deformed to more closely attain the surface roughness characteristics of the side 63 of the planar member. U.S. patent application Ser. No.07/968,370 describes a chilled roller apparatus suitable for use in conjunction with the above-described system and is incorporated by reference to the extent that such a system is described.

The redirecting rollers 65, the chilled roller 69, and the rollers 71, 73 are, like the rollers 55, 57, ordinarily turned as a result of contact with the moving substrate 27, material layer 29, or planar member 61 so that the surfaces of the rollers move at the same speed as the passing substrate, layer, or member. Good results have been achieved by driving some or all of the rollers 65, 69, 71, 73 at desired speeds so that the surfaces of the rollers move at the same speeds as the passing substrate 23, material layer 29, or planar member 61.

After the planar member 61 and the laminate 23 pass out of contact with the chilled roller apparatus 23, one or both of the planar member 61 and the laminate 23 are redirected by one or more redirecting rollers 65 such that the side 63 of the planar member and the surface 25 of the laminate are separated. Preferably, the laminate 23 is then drawn past the electrolyte layer applying means 43 which applies the electrolyte layer 41 on the smooth surface 25. The electrolyte layer applying means 43 is preferably a doctor blade assembly including a means for depositing electrolyte material onto the surface 25 of the laminate 23, such as an extruder 79, and a movable knife 81 for spreading the electrolyte material in an even layer of a desired thickness over the surface of the laminate.

A means (not shown) for monitoring and controlling the thickness of the electrolyte material layer is preferably provided. One such means is described in U.S. patent application Ser. No. 08/049,785 the disclosure of which is incorporated by reference to the extent that it discloses such a means. In that application, an apparatus and method are described in which the thickness of a laminate plus the thickness of an electrolyte layer is monitored and relayed to the electrolyte layer applying means so that more or less electrolyte material is applying onto a surface by a electrolyte material layer applying means and so that a knife is moved further from or closer to the surface in response to an indication that the sum of the thicknesses is less than or greater than a desired thickness.

However, as noted above, it is possible to draw the laminate 23 through a curing apparatus (not shown) prior to application of the electrolyte layer 41. Preferably, after the electrolyte layer 43 is applied on the surface 25 of the laminate 23, the electrolyte layer is cured, together with the material layer 29, in a single curing apparatus 45, which is preferably an electron beam apparatus. The cured laminate 23 and cured electrolyte layer 43 are then preferably rolled onto the roll 47 prior to subsequent processing for forming a battery.

The planar member 61 is preferably redirected so that it passes through a cleaning apparatus 85 for removing material for forming the material layer 29 that may have adhered to the side 63 of the planar member to ensure the consistent smoothness of that side. The side 63 of the planar member 61 is cleaned by the cleaning apparatus 85 by known cleaning techniques, such as vibrating the planar member, brushing or scraping the planar member, or passing the planar member through a solution and drying the planar member, such that material for forming the material layer 29 is caused to be removed from the planar member. The planar member 61 is then redirected so that it is again forced against the surface 25 of the laminate 23. The planar member 61' shown in FIG. 2, is redirected so that it is wound onto the roll 64. If desired, the planar member 61' is cleaned in a cleaning apparatus 85 prior to being wound onto the roll 64.

As shown in FIG. 1, material for forming the material layer 29 is preferably further inhibited from adhering to the side 63 of the planar member 61 by spraying one or more of the components of the material for forming the material layer in an electrostatically charged form onto the planar member past a corona point 87 of a spraying apparatus 89 and grounding the planar member such that a substantially even dispersion of the component or components over the side of the planar member occurs. The dispersed component or components of the material for forming the material layer 29 operates in a manner similar to "flouting" a surface prior to placing dough on the surface to inhibit the material for forming the material layer from adhering to the side 63 of the planar member 61. An apparatus and method for inhibiting the adherence of the material for forming the material layer 29 suitable for use as the spraying apparatus 89 is described in U.S. patent application Ser. No. 08/077,002, the disclosure of which is incorporated by reference to the extent that it describes such an apparatus.

The laminate 23 having a smooth surface 25 is formed in a method that begins with forming the material layer 29 onto the substrate 27. In practice, this can be done by extruding material for forming the material layer onto the substrate from the extruder 53 and passing the material for forming the material layer and the substrate through the nip 59 of the rollers 55, 57. The side 63 of the planar member 61 having desired surface roughness characteristics is forced against the material layer 29 on the substrate 27 such that the material layer attains substantially the same surface roughness characteristics as the side of the planar member. Preferably, the pair of rollers 55, 57 force the side 63 of the planar member 61 against the material for forming the material layer 29 as it is formed into the material layer.

The material layer 29 is preferably chilled by a chilled roller apparatus 67 as it is forced against the side 63 of the planar member 61. The chilled roller apparatus 67 includes a chilled roller 69, through which chilled liquid is circulated to attain a desired material layer 29 temperature, and one or more roller 71, 73 for forcing the side 63 of the planar member 61 against the material layer 29. At least one of the planar member 61 and the substrate 27 on which the material layer 29 is formed are redirected, preferably around redirecting rollers 65, such that the side 63 of the planar member 61 and the material layer 29 are separated. The planar member 61 is preferably driven, preferably by virtue of contact with the material layer 29 on the substrate 27, which is driven by one or more motors 39, 51, at the same speed as the substrate while forcing the side 63 of the planar member against the material layer on the substrate. The planar member 61 may, however, be driven by a separate motor (not shown).

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of forming a laminate for use in a polymer electrolyte battery, the method comprising the steps of:

applying an uncured, viscous liquid cathode material on a first surface of a constant thickness conductive substrate web;

drawing the substrate web on which the uncured cathode material is applied through a first constant width nip defined by a first roller and by a smooth, incompressible endless member having predetermined surface roughness characteristics extending around a portion of a second roller;

compressing the uncured cathode material on the first surface of the substrate web against the endless member such that the uncured cathode material forms a constant thickness uncured cathode layer on the substrate web and such that the uncured cathode material layer attains substantially the same surface roughness characteristics as the endless member, the endless member being formed of a material having relatively small tendency to adhere to the uncured cathode material;

drawing the endless member and the uncured cathode material layer on the substrate web through a second constant width nip defined by a chilled roller and a nip roller;

cooling the endless member and the uncured cathode material layer on the substrate web with the chilled roller to a temperature sufficient to solidify the uncured cathode material layer;

redirecting, subsequent to cooling of the uncured cathode material layer and the endless member, at least one of the endless member and the uncured cathode material layer on the substrate web such that the endless member and the uncured cathode material layer separate, the uncured cathode material layer retaining the surface roughness characteristics of the endless member;

applying an uncured polymer electrolyte material on top of the uncured cathode material layer subsequent to separation of the endless member and the uncured cathode material layer;

drawing the uncured cathode material layer on the substrate web and the uncured polymer electrolyte material through a doctor blade assembly to form a constant thickness uncured electrolyte material layer on top of the uncured cathode material layer; and curing the uncured cathode material layer and the uncured polymer electrolyte material layer together in a curing apparatus.

2. The method as set forth in claim 1, comprising the further steps of directing the endless member through a cleaning apparatus at a point subsequent to a point of separation between the endless member and the cathode material layer and prior to a point at which the endless member extends around the second roller, and cleaning the endless member of residual cathode material in the cleaning apparatus.

3. The method as set forth in claim 1, comprising the further step of spraying one or more of the components of the cathode material onto a surface of the endless member intended to contact the cathode material, the one or more components of the cathode material being sprayed onto the surface of the endless member in the form of an electrostatically charged spray.

* * * * *